UNITED STATES PATENT OFFICE.

WILLARD E. CASE, OF AUBURN, NEW YORK.

PROCESS OF MAKING ALUMINUM FLUOSULPHATE.

SPECIFICATION forming part of Letters Patent No. 503,900, dated August 22, 1893.

Application filed October 21, 1891. Renewed January 21, 1893. Serial No. 459,498. (No specimens.)

*To all whom it may concern:*

Be it known that I, WILLARD E. CASE, of Auburn, Cayuga county, New York, have invented a new and useful Improvement in the Manufacture of Aluminum Fluosulphate, of which the following is a specification.

The object of my invention is to produce an aluminum fluosulphate compound which shall be free from iron, and which may be utilized in place of pure sulphate of alumina or alum in paper making. I find that this aluminum fluosulphate may be produced more cheaply than the pure sulphate, and that in the paper-making industry it serves the same purpose. It may also be used as a source of metallic aluminum, and in certain other applications for Letters Patent, serially numbered 388,307, 388,308, 388,309, and 388,310, filed by me on the 9th day of April, 1891, and now pending, I have described various modes of treating it for aluminum extraction.

I produce my aluminum fluosulphate compound by the following process: I dissolve crude aluminum sulphate in water and add thereto calcium fluoride, preferably heating the solution to a temperature of 180° Fahrenheit in order to expedite the reaction. The result is an aluminum fluosulphate solution, and the aforesaid reaction may probably be represented by the following formula:

$$Al_2(SO_4)_3 + 2CaC_2 = Al_2F_4(SO_4) + 2CaSO_4.$$

As is well known, crude (or commercial) aluminum sulphate is more or less charged with iron which must be removed therefrom in order to adapt the material to the uses of the paper maker. It is also well known that impure aluminum sulphate heavily charged with iron is considerably cheaper than pure aluminum sulphate, and that if the iron can be cheaply extracted from the crude material, the cost of the resulting product may be greatly reduced. In order to remove the iron thus cheaply from the fluosulphate solution produced as above described, I add to it a quantity of the freshly precipitated white product obtained by adding a solution of an alkali-carbonate to an aluminum fluosulphate solution which is free from iron. This causes a reddish ferruginous precipitate, which may be removed by filtration or other means, and a clear resulting solution of aluminum, fluosulphate is produced. This substance I supply to the market as an article of manufacture, either in the form of a solution, or in a solid condition.

I claim—

The process of producing aluminum fluosulphate, free, or substantially free, from iron, which consists in adding calcium fluoride to an aqueous solution of crude aluminum sulphate, then adding a quantity of the freshly precipitated white product obtained by adding a solution of an alkali-carbonate to an aluminum fluosulphate solution which has been freed of iron, and then separating the resulting ferruginous precipitate from the fluosulphate solution by mechanical means.

WILLARD E. CASE.

Witnesses:
 FRANK A. DAVIS,
 ALFRED THOMAS.